(12) United States Patent
Jun

(10) Patent No.: US 10,309,848 B2
(45) Date of Patent: Jun. 4, 2019

(54) TORQUE SENSOR FOR STEERING DEVICE

(71) Applicant: LS AUTOMOTIVE TECHNOLOGIES CO., LTD., Gyeonggi-do (KR)

(72) Inventor: Chang-Nam Jun, Gyeonggi-do (KR)

(73) Assignee: LS AUTOMOTIVE TECHNOLOGIES CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/749,845

(22) PCT Filed: Oct. 22, 2015

(86) PCT No.: PCT/KR2015/011216
§ 371 (c)(1),
(2) Date: Feb. 2, 2018

(87) PCT Pub. No.: WO2017/034074
PCT Pub. Date: Mar. 2, 2017

(65) Prior Publication Data
US 2018/0224343 A1 Aug. 9, 2018

(30) Foreign Application Priority Data
Aug. 25, 2015 (KR) .......................... 10-2015-0119598

(51) Int. Cl.
*G01L 3/00* (2006.01)
*G01L 3/10* (2006.01)
(Continued)

(52) U.S. Cl.
CPC ............ *G01L 3/104* (2013.01); *B62D 5/0481* (2013.01); *B62D 6/10* (2013.01); *G01L 5/221* (2013.01)

(58) Field of Classification Search
CPC . G01L 3/104; G01L 5/221; G01L 3/10; G01L 5/22; B62D 5/0481; B62D 6/10
(Continued)

(56) References Cited

U.S. PATENT DOCUMENTS 7,644,635 B2   1/2010  Prudham et al. ........ 73/862.334
8,327,722 B2   12/2012 Sasanouchi et al. .... 73/862.333
(Continued)

FOREIGN PATENT DOCUMENTS

JP     2011-117929    6/2011  ............... B62D 5/04
KR   10-2007-0043000  4/2007  ............... G01L 3/10
(Continued)

OTHER PUBLICATIONS

International Search Report (ISR) from corresponding International Application No. PCT/KR2015/011216 dated May 23, 2016, with English translation.

*Primary Examiner* — Max H Noori
(74) *Attorney, Agent, or Firm* — Harness, Dickey & Pierce, P.L.C.

(57) ABSTRACT

A torque sensor for a steering system according to an aspect of the present disclosure includes a first magnetic body having an open region and an unopened region arranged in an alternating manner along a circumference of a circular connecting member, the open region and the unopened region facing a magnet having N and S poles arranged in an alternating manner in a circular shape, the magnet installed at one end of a torsion bar, the first magnetic body connected to the other end of the torsion bar; a second magnetic body placed facing the magnet along an outer periphery of the magnet with the first magnetic body interposed between the second magnetic body and the magnet; a third magnetic body placed facing the first magnetic body while failing to face the magnet; and a magnetic sensing member placed between the second magnetic body and the third magnetic body.

12 Claims, 16 Drawing Sheets

(51) Int. Cl.
  *B62D 6/10*   (2006.01)
  *B62D 5/04*   (2006.01)
  *G01L 5/22*   (2006.01)

(58) Field of Classification Search
  USPC .................................................. 73/862.331
  See application file for complete search history.

(56) References Cited

U.S. PATENT DOCUMENTS

| | | | | |
|---|---|---|---|---|
| 2002/0189371 | A1* | 12/2002 | Nakane | B62D 6/10 |
| | | | | 73/862.333 |
| 2012/0060628 | A1* | 3/2012 | Sanada | B62D 6/10 |
| | | | | 73/862.335 |
| 2012/0260746 | A1 | 10/2012 | Lee | 73/862.332 |
| 2013/0312539 | A1* | 11/2013 | Shimomura | G01L 3/101 |
| | | | | 73/862.325 |
| 2017/0108411 | A1* | 4/2017 | Komuro | B60W 30/02 |
| 2018/0180498 | A1* | 6/2018 | Murakami | G01L 3/10 |

FOREIGN PATENT DOCUMENTS

| | | | | |
|---|---|---|---|---|
| KR | 10-20110025265 | 3/2011 | ............... | B62D 6/10 |
| KR | 10-2012-0004032 | 1/2012 | ............... | B62D 6/10 |
| KR | 10-2012-0069932 | 6/2012 | ............... | B62D 6/10 |
| KR | 10-2012-0117294 | 10/2012 | ............... | G01L 3/10 |

* cited by examiner (a)

(b)

(a)

(b)

(a)

(b)

TORQUE SENSOR FOR STEERING DEVICE

CROSS-REFERENCE TO RELATED APPLICATIONS

This application is a national phase application of PCT Application No. PCT/KR2015/011216, filed on Oct. 22, 2015, which claims the benefit and priority to Korean Patent Application No. 10-2015-0119598, filed Aug. 25, 2015. The entire disclosures of the applications identified in this paragraph are incorporated herein by references.

TECHNICAL FIELD

The present disclosure relates to a torque sensor for a steering system, and more particularly, to a non-contact torque sensor for a steering system that allows an output axis connected to wheels to rotate equally with an input axis when the input axis is rotated by manipulation of a steering wheel, in order to improve steering performance.

BACKGROUND

Generally, while a vehicle is driving or stopped, wheels contacting the ground rotate by the rotation of a steering wheel. That is, when a steering wheel is rotated in the left or right direction, wheels are rotated in the same direction. However, because wheels are in contact with the ground, there is a problem with a difference in an amount of rotation between the steering wheel and the wheels due to a friction force occurring between the wheels and the ground.

To solve the problem, a torque sensor is provided to measure and correct a difference in rotation angle between the steering wheel and the wheels. The torque sensor measures a difference in rotation angle between the steering wheel and the wheels, and allows the wheels to further rotate as much as the measured difference using a separate driving means, to steer the vehicle in an intended direction safely and precisely, thereby increasing steering convenience.

The torque sensor is largely classified into a contact type and a non-contact type, and due to noise and durability reduction problems of the contact type, non-contact torque sensors are being recently employed. Non-contact torque sensors are largely classified into magnetoresistive, magnetostrictive, capacitive and optical detection techniques.

A traditional magnetoresistive detection-based torque sensor provide in an electric assisted steering system is constructed such that a steering wheel manipulated by a driver is connected to the top of an input axis, and the bottom of the input axis is connected to the top of an output axis by a torsion bar. Also, the bottom of the output axis is connected to the wheels, and the outside of the bottom of the input axis including the torsion bar and the top of the output axis is protected by a housing. Inside the housing, the torque sensor and the driving means as described above are provided. Representatively, Korean Patent Publication No. 10-2007-0043000 and U.S. Pat. No. 8,327,722 are taken as examples. However, these traditional torque sensors have many components, are complex, and suffer from a number of losses during magnetic induction.

DISCLOSURE

Technical Problem

The present disclosure is directed to providing a non-contact torque sensor for a steering system with a smaller number of components and a minimized magnetic loss during magnetic induction.

Technical Solution

To achieve the object, a torque sensor for a steering system according to an aspect of the present disclosure includes a first magnetic body having an open region and an unopened region arranged in an alternating manner along a circumference of a circular connecting member, the open region and the unopened region facing a magnet having N and S poles arranged in an alternating manner in a circular shape, the magnet installed at one end of a torsion bar, the first magnetic body connected to the other end of the torsion bar, a second magnetic body placed facing the magnet along an outer periphery of the magnet with the first magnetic body interposed between the second magnetic body and the magnet, a third magnetic body placed facing the first magnetic body while failing to face the magnet, and a magnetic sensing member placed between the second magnetic body and the third magnetic body.

The second magnetic body may include a magnetic induction surface which surface-faces the magnet with the open region and the unopened region interposed between the magnetic induction surface and the magnet, and a magnetic concentration part which extends in an outward direction from the magnetic induction surface.

The third magnetic body may include a magnetic induction surface which surface-faces the connecting member of the first magnetic body, and a magnetic concentration part which extends in an outward direction from the magnetic induction surface of the third magnetic body.

The magnetic sensing member may be installed in an air gap between the magnetic concentration part of the second magnetic body and the magnetic concentration part of the third magnetic body.

The connecting member of the first magnetic body and the magnetic induction surface of the third magnetic body may surface-face in a lengthwise direction of an axis.

The second magnetic body and the third magnetic body may be in a shape of a segment of a circle.

To achieve the object, a torque sensor for a steering system according to another aspect of the present disclosure includes a first magnetic body having an open region and an unopened region facing a magnet having N and S poles arranged in an alternating manner in a circular shape to produce and absorb magnetic force lines, the magnet connected to one end of a torsion bar, wherein the first magnetic body allows the magnetic force lines to pass through the open region and induces the magnetic force lines through the unopened region, and the first magnetic body is connected to the other end of the torsion bar, a second magnetic body which induces the magnetic force lines having passed through the open region and transmits the magnetic force lines to the open or unopened region, a third magnetic body which transmits the magnetic force lines induced at and transmitted from the second magnetic body to the first magnetic body, and the magnetic force lines induced at and transmitted from the first magnetic body to the second magnetic body, and a magnetic sensing member placed between the second magnetic body and the third magnetic body to sense a change in the magnetic force lines.

When a twist in the torsion bar is absent, the magnetic force lines produced by the magnet may be induced at the unopened region and return to the magnet to form a first closed loop, and the magnetic force lines produced by the magnet may be induced at the second magnetic body through the open region and return to the magnet through the open region to form a second closed loop.

When a twist in the torsion bar is a positive (+) value, the magnetic force lines produced by the magnet may be induced at the unopened region and return to the magnet to form a first closed loop, the magnetic force lines produced by the magnet may be induced at the second magnetic body through the open region and return to the magnet through the unopen region to form a second closed loop, and the magnetic force lines produced by the magnet may be induced at the second magnetic body, the third magnetic body and the unopened region in a sequential order through the open region and are transmitted to the magnet to form a third closed loop.

When a twist in the torsion bar is a negative (−) value, the magnetic force lines produced by the magnet may be induced at the unopened region and return to the magnet to form a first closed loop, the magnetic force lines produced by the magnet may be induced at the unopened region and the second magnetic body in a sequential order and return to the magnet through the unopen region to form a second closed loop, and the magnetic force lines produced by the magnet may be induced at the unopened region, the third magnetic body and the second magnetic body in a sequential order and are transmitted to the magnet through the open region to form a third closed loop.

The first magnetic body and the second magnetic body may surface-face the magnet, and the third magnetic body may surface-face the first magnetic body while failing to face the magnet.

The second magnetic body and the third magnetic body may be in a shape of a segment of a circle.

Advantageous Effects

The present disclosure has a simple magnetic circuit configuration and a reduction of the total number of components, compared to conventional art. Accordingly, a magnetic material is used in a smaller amount than conventional art.

Further, as compared to conventional art, the present disclosure has a smaller number of air gaps (reluctance) that lower the flow of magnetic force lines and the magnetic flux density, as well as a smaller number of variable reluctance members, thereby reducing a loss during induction of a magnetic force from a magnet and increasing magnetic induction efficiency.

MODE FOR CARRYING OUT THE INVENTION

The foregoing objects, features, and advantages will become apparent from the following detailed description in relation to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily make the essence of the disclosure vague, its detailed description is omitted herein. Hereinafter, a preferred embodiment according to the present disclosure is described in detail with reference to the accompanying drawings.

Figure 1:
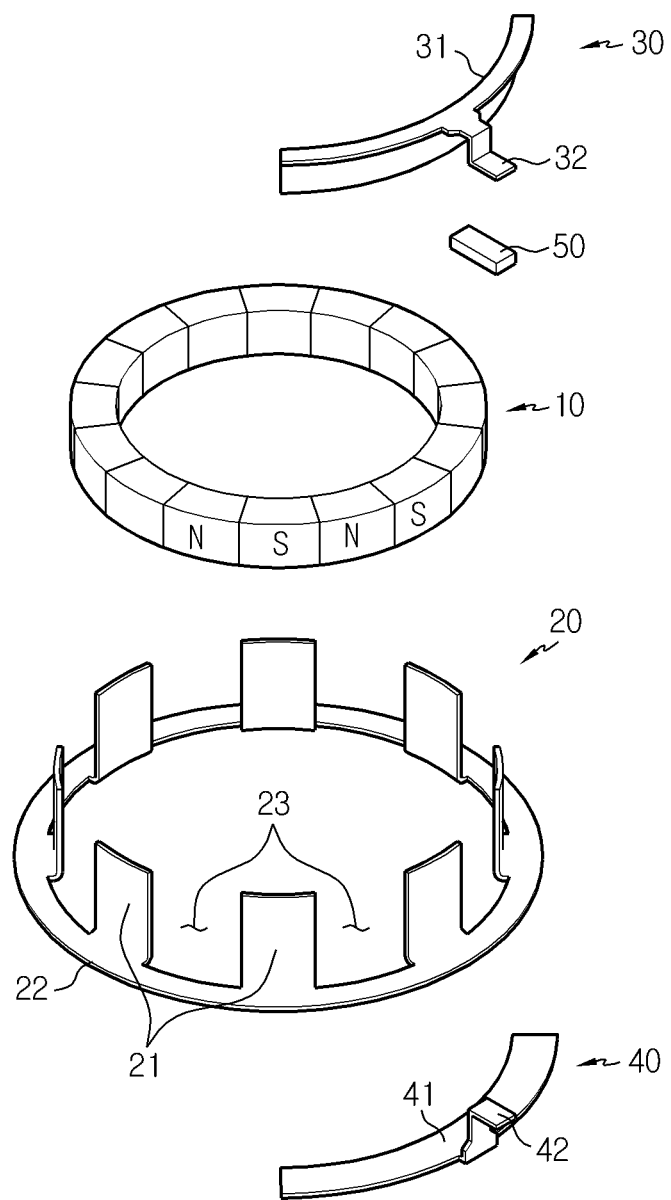
FIG. 1 is an exploded perspective view of a torque sensor according to an embodiment of the present disclosure.
Figure 2:
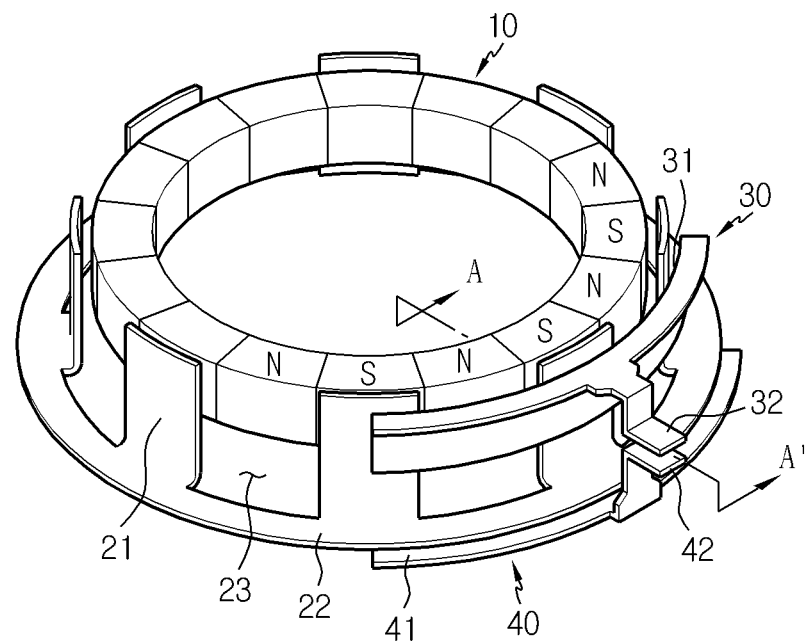
FIG. 2 is an assembled perspective view of the torque sensor of FIG. 1.

FIG. 1 is an exploded perspective view of a torque sensor according to an embodiment of the present disclosure, and FIG. 2 is an assembled perspective view of the torque sensor of FIG. 1.

Referring to FIGS. 1 and 2, the torque sensor according to this embodiment includes a magnet 10, a first magnetic body 20, a second magnetic body 30, a third magnetic body 40, and a magnetic sensing member 50.

The magnet 10 has a circular array. As shown in FIGS. 1 and 2, the magnet 10 is a permanent magnet which has the N and S poles arranged in an alternating manner along the horizontal direction and placed in a row, not in two rows (upper and lower). The magnet 10 has an even number of N and S poles in total. For example, the magnet 10 has eight N poles and eight S poles. The magnet 10 is connected to an input axis of a steering wheel of a vehicle so that the magnet 10 can rotate with the input axis as the steering wheel rotates, but is not limited thereto, and the magnet 10 is connected to an output axis connected to wheels and thus can rotate with the output axis as the wheels rotate.

The first magnetic body 20 has an open region 23 and an unopened region 21 surface-facing the magnet 10 along the outer peripheral surface of the magnet 10, and includes a ring-shaped connecting member 22 connecting the open region 23 and the unopened region 21. The open region 23 and the unopened region 21 are arranged facing the magnet 10 along the connecting member 22 at a predetermined angle interval with respect to the magnet 10. That is, the first magnetic body 20 has a crown structure in which a plurality of teeth surface-facing the magnet 10 are arranged at a predetermined angle interval along the circumference of the connecting member 22 and juts out in the longitudinal direction of the axis from the connection member 22. The first magnetic body 20 is connected to the output axis connected to the wheels of the vehicle, and when the wheels rotate, the first magnetic body 20 can rotate with the output axis, but is not limited thereto, and the first magnetic body 20 is connected to the input axis connected to the steering wheel of the vehicle, and when the steering wheel is rotated, the first magnetic body 20 can rotate with the input axis.

When the magnet 10 is connected to the input axis, the first magnetic body 20 is connected to the output axis, or when the magnet 10 is connected to the output axis, the first magnetic body 20 is connected to the input axis. In this instance, the input axis and the output axis are connected to a torsion bar. Accordingly, the magnet 10 and the first magnetic body 20 are installed on the opposite sides to each other with respect to the torsion bar. When the input axis and the output axis differ in rotation angle, a twist occurs in the torsion bar, causing a positional change between the magnet 10 and the first magnetic body 20.

The unopened region 21 of the first magnetic body 20, i.e., the teeth is a magnetic induction region for inducing the magnetic force lines emanating from or returning to the magnet 10, and has half of the number of poles of the magnet 10. For example, if the magnet 10 has sixteen poles, i.e., eight pole pairs, eight magnetic induction regions are formed.

The connecting member 22 of the first magnetic body 20 transmits, to adjacent teeth or the third magnetic body 40 to be described below, the magnetic force lines emanating from the magnet 10 and induced in the unopened region 21, i.e., the teeth. Also, the connecting member 22 of the first magnetic body 20 transmits to the teeth 21 the magnetic force lines transmitted from the third magnetic body 40. The connecting member 22 of the first magnetic body 20 surface-faces the third magnetic body 40 spaced apart a predetermined air gap from the third magnetic body 40 to transmit the magnetic force lines to the third magnetic body 40 or receive the magnetic force lines from the third magnetic body 40. To this end, the connecting member 22 has a surface approximately perpendicular to the open region 23 and the unopened region 21. That is, the connecting member 22 has an area in the radial direction of the axis, and as described below, the third magnetic body 40 faces the connecting member 22 in the longitudinal direction of the axis.

The second magnetic body 30 is a magnetic induction member which is arranged to surface-face the outer peripheral surface of the magnet 10 spaced apart a predetermined distance from the magnet 10 along the outer peripheral surface of the magnet 10 with the first magnetic body 20 interposed between the second magnetic body 30 and the magnet 10. As shown in FIGS. 1 and 2, the second magnetic body 30 includes a magnetic induction surface 31 which is in the shape of a segment of a circle and surface-faces the outer peripheral surface of the magnet 10 spaced apart a predetermined air gap from the first magnetic body 20, and a magnetic concentration part 32 which extends in the direction facing away from the magnet 10, i.e., an outward direction from the magnetic induction surface 31.

The magnetic induction surface 31 of the second magnetic body 30 induces the magnetic force lines emanating from the magnet 10 and going through the open region 23 of the first magnetic body 20 and transmits them to the open region 23 or the teeth 21 of the first magnetic body 20 again, or transmits some of the magnetic force lines to the magnetic concentration part 32. Also, the magnetic induction surface 31 of the second magnetic body 30 transmits the magnetic force lines transmitted from the magnetic concentration part 32 to the magnet 10 through the open region 23, or transmits them to the teeth 21 of the first magnetic body 20. The magnetic concentration part 32 concentrates the magnetic force lines induced in and transmitted from the magnetic induction surface 31 of the second magnetic body 30 and transmits them to the third magnetic body 40, or transmits the magnetic force lines transmitted from the third magnetic body 40 to the magnetic induction surface 31.

The third magnetic body 40 is a magnetic induction member which is arranged to surface-face the first magnetic body 20 spaced apart a predetermined distance from the first magnetic body 20, while not surface-facing the magnet 10. That is, the third magnetic body is present at a location beyond the vertical width of the magnet 10, and does not surface-face the magnet 10. As shown in FIGS. 1 and 2, the third magnetic body 40 includes a magnetic induction surface 41 which is in the shape of a segment of a circle and surface-faces the connecting member 22 of the first magnetic body 20 spaced apart a predetermined air gap, and a magnetic concentration part 42 which extends in the direction facing away from the magnet 10, i.e., an outward direction from the magnetic induction surface 41.

The magnetic induction surface 41 of the third magnetic body 40 induces the magnetic force lines emanating from the magnet 10 and going from or returning to the first magnetic body 20. The magnetic concentration part 42 of the third magnetic body 40 concentrates the magnetic force lines emerging from the first magnetic body 20 and induced in the magnetic induction surface 41 of the third magnetic body 40 and transmits them to the magnetic concentration part 32 of the second magnetic body 30, or receives the magnetic force liens from the magnetic concentration part 32 of the second magnetic body 30 and transmits them to the magnetic induction surface 41 of the third magnetic body 40. The magnetic concentration part 42 of the third magnetic body 40 and the magnetic concentration part 32 of the second magnetic body 30 surface-face each other spaced apart a predetermined air gap from each other.

Although this embodiment describes that the magnetic induction surface 41 of the third magnetic body 40 is disposed below the connecting member 22 of the first magnetic body 20, i.e., in the output axis direction and surface-faces the connecting member 22 of the first magnetic body 20, the present disclosure is not limited thereto, and the magnetic induction surface 41 of the third magnetic body 40 may be disposed above the connecting member 22 of the first magnetic body 20, i.e., in the input axis direction and surface-face the connecting member 22 of the first magnetic body 20. In this instance, even though the magnetic induction surface 41 of the third magnetic body 40 is disposed above the connecting member 22 of the first magnetic body 20, it does not needs to face the magnet 10. Here, not facing refers to not facing each other in the longitudinal direction and radial direction of the axis, and represents that the magnetic induction surface 41 of the third magnetic body 40 is disposed at a location beyond the vertical width of the magnet 10.

The magnetic sensing member 50 is installed at an air gap formed between the magnetic concentration part 32 of the second magnetic body 30 and the magnetic concentration part 42 of the third magnetic body 40. The magnetic sensing member 50 senses changes in magnitude and direction of the magnetic force lines formed between the two magnetic concentration parts 32 and 42. The magnetic sensing member 50 includes, for example, a hall sensor, an AMR sensor or a GMR sensor.

Figure 3:
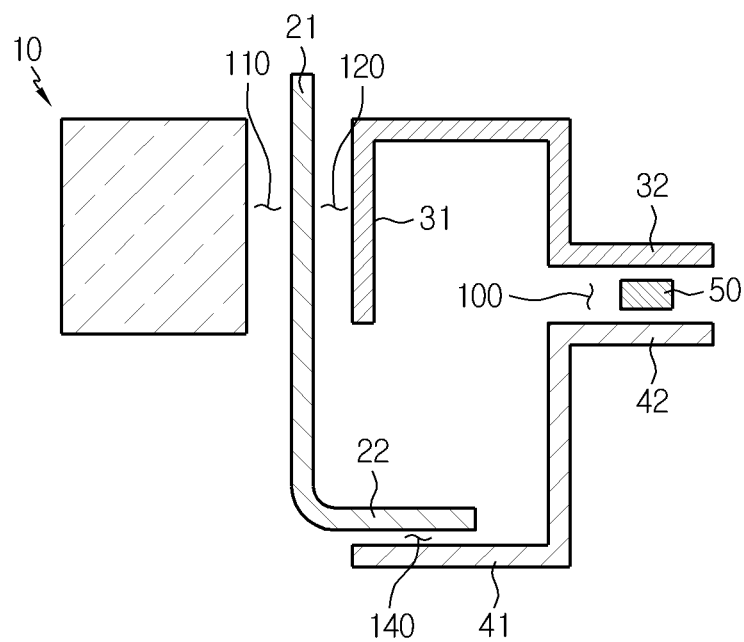
FIG. 3 is a cross-sectional view taken along the line A-A' of FIG. 2.

FIG. 3 is a cross-sectional view taken along the line A-A' of FIG. 2. Referring to FIG. 3, the magnet 10 and the teeth 21 of the first magnetic body 20 surface-face each other separated by a predetermined air gap 110. Also, the magnetic induction surface 31 of the second magnetic body 30 surface-faces the magnet 10 with the first magnetic body 20 interposed between. In this instance, the magnetic induction surface 31 of the second magnetic body 30 and the teeth 21 of the first magnetic body 20 surface-face each other separated by a predetermined air gap 120. Also, the magnetic induction surface 41 of the third magnetic body 40 and the connecting member 22 of the first magnetic body 20 surface-face each other separated by a predetermined air gap 140. The magnetic concentration part 32 of the second magnetic body 30 and the magnetic concentration part 42 of the third magnetic body 40 surface-face each other separated by a predetermined air gap 100. These air gaps 100, 110, 120 and 140 act as a medium having relatively large reluctance, and the first magnetic body 20, the second magnetic body 30 and the third magnetic body 40 are made of a soft magnetic material and act as a medium having relatively small reluctance.

When a driver manipulates the steering wheel, a rotational force is transmitted to the input axis, and the torsion bar rotates by the rotation of the input axis. Also, because the torsion bar is also connected to the output axis, the rotational force is transmitted to the output axis and the direction of the wheels is changed to the direction of the manipulated steering wheel. In this instance, when the wheels of the vehicle do not rotate as much as the rotation angle of the steering wheel, a twist occurs in the torsion bar, and accordingly, a relative positional change occurs between the magnet 10 connected to the input axis and the first magnetic body 20 connected to the output axis. The relative positional change causes changes of an area of the unopened region 21 of the first magnetic body 20, i.e., the teeth facing the N and S poles of the magnet 10, and an area of the open region 23 of the first magnetic body 20 facing the N and S poles of the magnet 10. Accordingly, the magnetic intensity and the direction of the magnetic force lines between the magnetic concentration parts 32 and 42 change, and the magnetic sensing member 50 senses this change. Specifically, the operation of the torque sensor of this embodiment as a function of the twist angle is hereinafter described.

Figure 4:
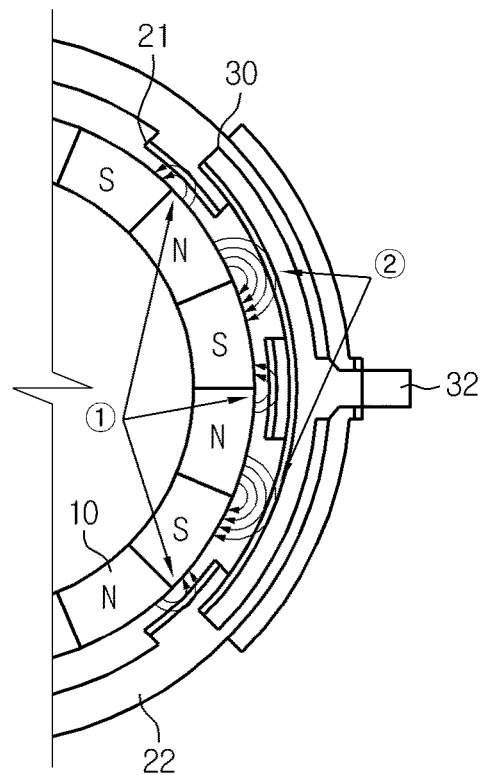
FIG. 4 is a partial plane view showing the direction of magnetic force lines of a torque sensor according to an embodiment of the present disclosure.
Figure 4:
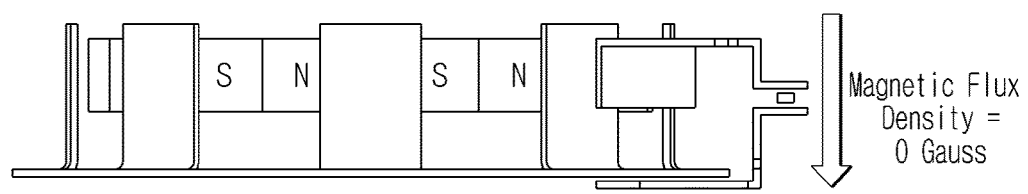

FIG. 4 is a partial plane view showing the direction of magnetic force lines of the torque sensor according to an embodiment of the present disclosure, showing the direction of magnetic force lines when the twist angle is 0 degree.

Referring to FIG. 4, when the twist angle is 0 degree, a facing area ratio of the teeth 21 of the first magnetic body 20 and the N and S poles of the magnet 10 is 50:50. Thus, the magnetic force lines emerging from the N pole of the magnet form a closed loop (hereinafter, #1 closed loop) as indicated by ①. That is, the magnetic force lines emerging from the N pole are induced in the teeth 21 of the first magnetic body 20 and then return to the S pole. Also, through the open region 23 of the first magnetic body 20, a facing area ratio of the magnetic induction surface 31 of the second magnetic body 30 and the N and S poles of the magnet 10 is 50:50 too. Thus, the magnetic force lines emanating from the N pole of the magnet 10 and going through the open region 23 of the first magnetic body 20 form a closed loop (hereinafter, #2 closed loop) as indicated by ②. That is, the magnetic force lines emanating from the N pole and going out through the open region 23 are induced in the magnetic induction surface 31 of the second magnetic body 30 and return to the S pole through the open region 23. In this case, the N pole magnetic field may be induced in the magnetic concentration part 32 of the second magnetic body 30 and the magnetic concentration part 42 of the third magnetic body 40, but because an induction ratio of the N pole magnetic field induced in each of the magnetic concentration parts 32 and 42 is equal, namely, 5:5, the magnetic force lines do not flow to the air gap 100 in which the magnetic sensing member 50 is installed. Thus, the magnetic flux density at the magnetic sensing member 50 is 0 Gauss.

All the magnetic force lines produced by the magnet 10 move through #1 closed loop and #2 closed loop. In this instance, because a ratio of the magnetic force lines flowing in #1 closed loop and #2 closed loop, i.e., the magnetic flux density changes depending on the distance of the air gap 110 between the magnet 10 and the teeth 21 of the first magnetic body 20, the distance of the air gap 120 between the teeth 21 and the magnetic induction surface 31 of the second magnetic body 30, and the magnetic permeability characteristics of the magnetic material of the first magnetic body 20 and the second magnetic body 30, a separate reference thereto is not made herein. However, even though the distance of the air gaps 110 and 120 or the magnetic permeability characteristics of the material of the first and second magnetic bodies 20 and 30 change, the magnetic properties induced between the magnetic concentration parts 32 and 42 in which the magnetic sensing member 50 is installed as described previously may be described equally.

Figure 5:
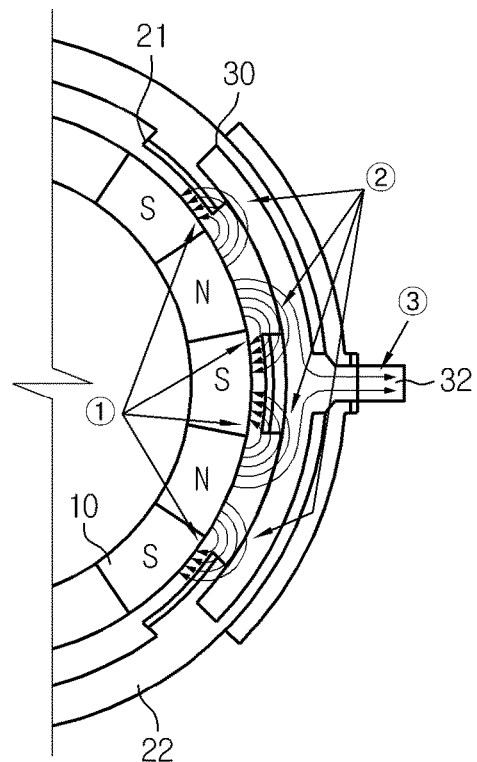
FIG. 5 is a partial plane view showing the direction of magnetic force lines of a torque sensor according to another embodiment of the present disclosure.
Figure 5:
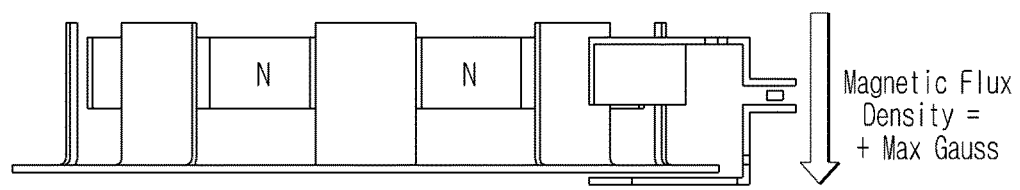
Figure 6:
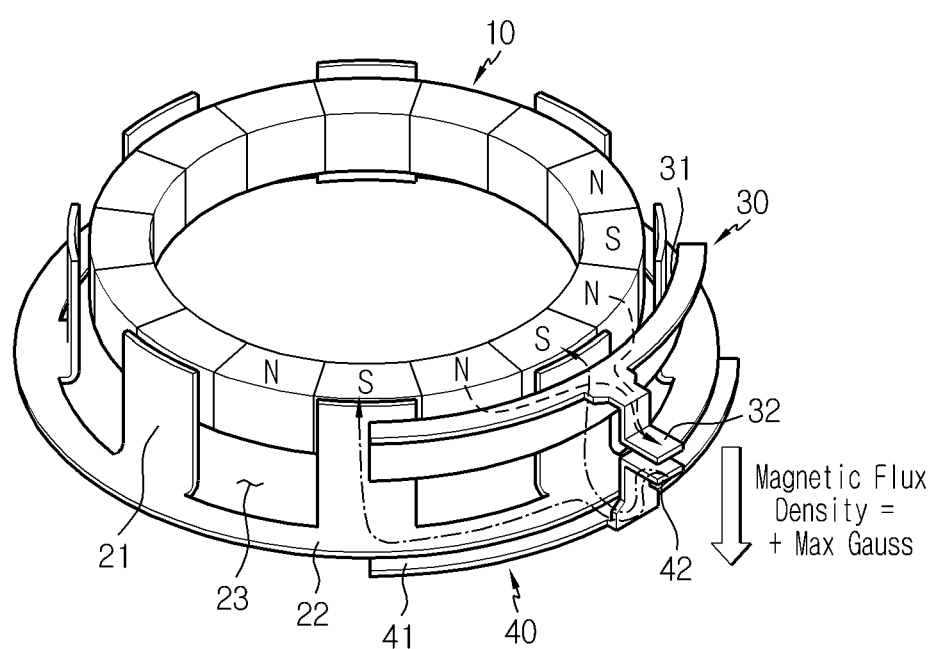
FIG. 6 is a full perspective view of FIG. 5.

FIG. 5 is a partial plane view showing the direction of magnetic force lines of the torque sensor according to another embodiment of the present disclosure, and FIG. 6 is a full perspective view of FIG. 5, showing the direction of magnetic force lines when the twist angle is +maximum (Max).

Referring to FIGS. 5 and 6, when the twist angle is +maximum, an area ratio of the teeth 21 of the first magnetic body 20 facing the N and S poles of the magnet 10 is 0:100. Thus, some of the magnetic force lines emanating from the N pole of the magnet 10 are induced in the teeth 21 of the first magnetic body 20 adjacent to the N pole and then return to the S pole of the magnet 10 to form a closed loop (hereinafter, #1 closed loop) as indicated by ①. Also, through the open region 23 of the first magnetic body 20, a facing area ratio of the magnetic induction surface 31 of the second magnetic body 30 and the N and S poles of the magnet 10 is 100:0 too. Thus, the magnetic force lines emanating from the N pole of the magnet 10 and passing through the open region 23 are induced in the magnetic induction surface 31 of the second magnetic body 30 and then return to the S pole of the magnet 10 through the teeth 21 of the first magnetic body 20 to form a closed loop (hereinafter, #2 closed loop) as indicated by ②. In this case, the N magnetic field is induced in the magnetic concentration part 32 of the second magnetic body 30 and the S pole magnetic field is induced in the magnetic concentration part 42 of the third magnetic body 40. Thus, some of the magnetic force lines emanating from the N pole of the magnet 10 are induced in the magnetic concentration part 42 of the third magnetic body 40 through the magnetic concentration part 32 of the second magnetic body 30 to form a closed loop (hereinafter, #3 closed loop) as indicated by ③. The magnetic force lines formed by #3 closed loop go through the magnetic sensing member 50 installed between the magnetic concentration parts 32 and 42, and thus, the magnetic sensing member 50 may detect the magnetic flux density created by the magnetic force lines.

All the magnetic force lines produced by the magnet 10 move through #1, #2 and #3 closed loops. In this instance, because a ratio of the magnetic force lines flowing in #1, #2 and #3 closed loops, i.e., the magnetic flux density changes depending on the distance of the air gap 110 between the magnet 10 and the teeth 21 of the first magnetic body 20, the distance of the air gap 120 between the teeth 21 and the magnetic induction surface 31 of the second magnetic body 30, the distance of the air gap 140 between the magnetic induction surface 41 of the third magnetic body 40 and the connecting member 22 of the first magnetic body 20, the distance of the air gap 100 between the magnetic concentration parts 32 and 42, and the magnetic permeability characteristics of the magnetic material of the first magnetic body 20, the second magnetic body 30 and the third magnetic body 40, a separate reference thereto is not made herein. However, even though the distance of the air gaps 110, 120, 100 and 140 or the magnetic permeability characteristics of the material of the first, second and third magnetic bodies 20, 30 and 40 change, the magnetic characteristics induced in between the magnetic concentration parts 32 and 42 in which the magnetic sensing member 50 is installed as described previously may be described equally. That is, when the distance of the air gaps 110, 120, 100 and 140 or the magnetic permeability characteristics of the material of the first, second and third magnetic bodies 20, 30 and 40 change, there is only a relative change of magnetic intensity and variation, while it is the same in the respect of a resulting closed loop, routes of the magnetic force lines, and the magnetic flux density formed between the magnetic concentration parts 32 and 42 when the twist angle is a positive (+) value is maximum when the twist angle is +maximum.

The embodiment described with reference to FIG. 4 is when a relative twist angle between the magnet 10 and the first magnetic body 20 is 0 degree. Also, the embodiment described with reference to FIGS. 5 and 6 is when a relative twist angle between the magnet 10 and the first magnetic body 20 is +maximum. When the twist angle between the magnet 10 and the first magnetic body 20 gradually increases from 0 degree to +maximum, the magnetic flux density induced in the air gap 100 in which the magnetic sensing member 50 is installed through #3 closed loop as described previously gradually increases as well. The magnetic sensing member 50 can determine the degree of twist of the torsion bar installed between the input axis connected to the steering wheel and the output axis connected to the wheels by sensing a linear change of magnetic flux density.

magnetic induction surface 41 of the third magnetic body 40→the connecting member 22 of the first magnetic body 20→the teeth 21 of the first magnetic body 20→the S pole of the magnet 10. On the contrary, the movement route of magnetic force lines in #3 closed loop when the twist angle is −maximum is the N pole of the magnet 10→the teeth 21 of the first magnetic body 20→the connecting member 22 of the first magnetic body 20→the magnetic induction surface 41 of the third magnetic body 40→the magnetic concentration part 42 of the third magnetic body 40→the magnetic concentration part 32 of the second magnetic body 30→the magnetic induction surface 31 of the second magnetic body 30→the S pole of the magnet 10. When the twist angle between the magnet 10 and the first magnetic body 20 gradually increases from 0 degree to −maximum, the magnetic flux density induced at the air gap 100 in which the magnetic sensing member 50 is installed through #3 closed loop gradually increases as well. The magnetic sensing member 50 may determine the degree of twist of the torsion bar installed between the input axis connected to the steering wheel and the output axis connected to the wheels by sensing a linear change of magnetic flux density.

It should be understood that (+) and (−) when the twist angle is +maximum and −maximum is relative in the above description. That is, when any one direction of the twist is set to (+) direction, a contrary twist is (−) direction.

The changes of the area of the teeth 21 of the first magnetic body 20 and the magnetic induction surface 31 of the second magnetic body 30 facing the N and S poles of the magnet 10, and changes of polarity induced at the magnetic concentration parts 32 and 42 and changes of magnetic flux density induced at the magnetic sensing member 50 as a function of the twist angle are summarized as shown in the following [Table 1].

TABLE 1

| | Area changes between teeth 21 and magnetic induction surface 31, and magnet 10 | | | | | | | |
|---|---|---|---|---|---|---|---|---|
| | Teeth 21 | | Magnetic induction surface 31 | | Ratio of polarity changes induced at magnetic concentration parts 32 and 42 | | | Magnetic flux density changes of magnetic |
| Twist angle | N pole | S pole | N pole | S pole | | N pole | S pole | sensing member |
| +Max | 0% | 100% | 100% | 0% | 32 | 100% | 0% | +Max Gauss |
| | | | | | 42 | 0% | 100% | |
| ~ 0 degree | ↓ 50% | ↑ 50% | ↑ 50% | ↓ 50% | 32 | 50% | 50% | ↑ 0 Gauss |
| | | | | | 42 | 50% | 50% | |
| ~ −Max | ↑ 100% | ↓ 0% | ↓ 0% | ↑ 100% | 32 | 0% | 100% | ↓ −Max Gauss |
| | | | | | 42 | 100% | 0% | |

Figure 7:
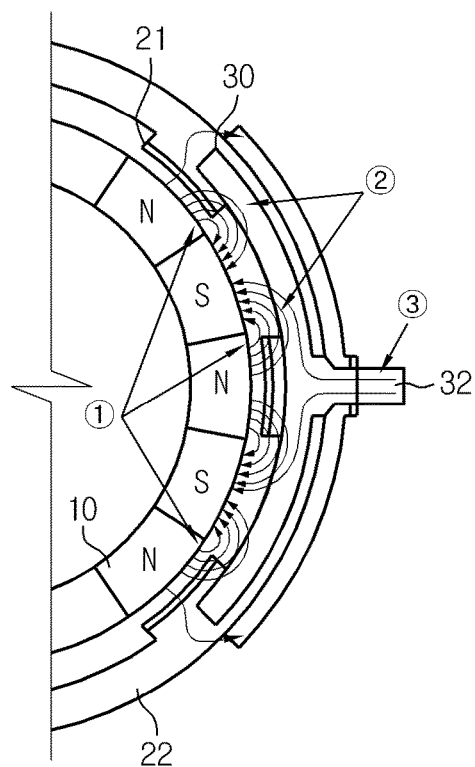
FIG. 7 is a partial plane view showing the direction of magnetic force lines of a torque sensor according to still another embodiment of the present disclosure.
Figure 7:
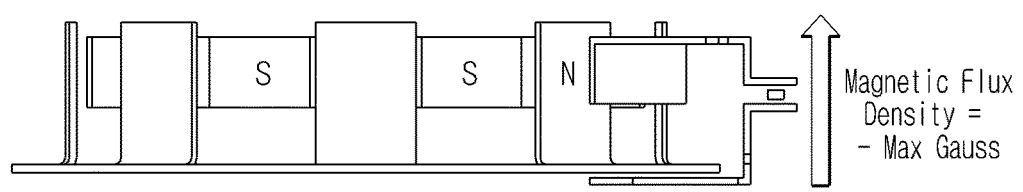
Figure 8:
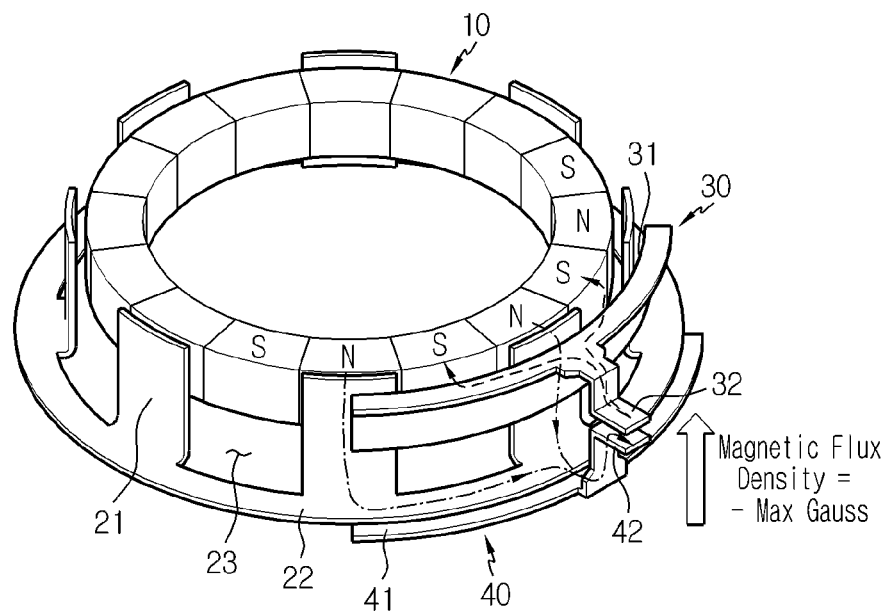
FIG. 8 is a full perspective view of FIG. 7.
Figure 9:
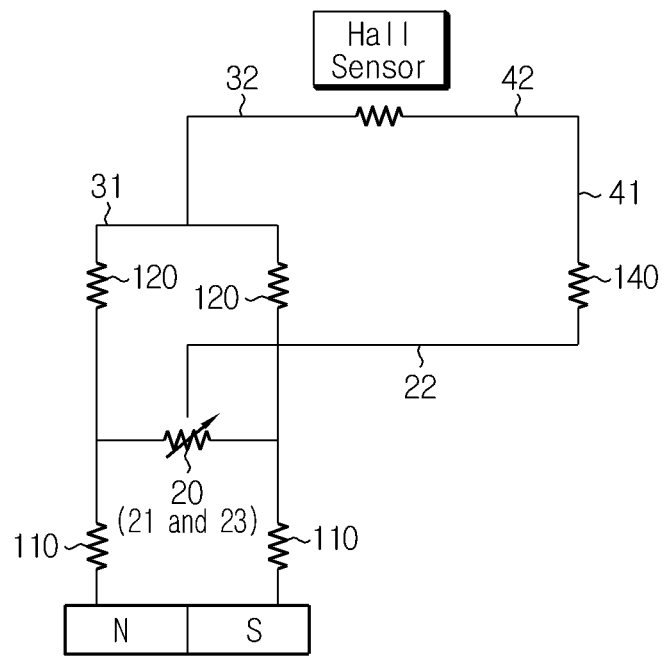
FIG. 9 is a circuit diagram showing a magnetic equivalent circuit of the torque sensor shown in FIGS. 1 and 2.

FIG. 7 is a partial plane view showing the direction of magnetic force lines of the torque sensor according to still another embodiment of the present disclosure, and FIG. 8 is a full perspective view of FIG. 7, showing the direction of magnetic force lines when the twist angle is −maximum (Max). The closed loop when the twist angle is −maximum as shown in FIGS. 7 and 8 is only in the opposite direction of magnetic force lines to the closed loop when the twist angle is +maximum as described with reference to FIGS. 5 and 6. That is, the movement route of magnetic force lines in #3 closed loop when the twist angle is +maximum is the N pole of the magnet 10→the magnetic induction surface 31 of the second magnetic body 30→the magnetic concentration part 32 of the second magnetic body 30→the magnetic concentration part 42 of the third magnetic body 40→the FIG. 9 is a circuit diagram showing a magnetic equivalent circuit of the torque sensor shown in FIGS. 1 and 2. The same reference numerals as FIGS. 1 and 2 in the magnetic equivalent circuit of FIG. 9 correspond to the components of FIGS. 1 and 2.

According to the Maxwell's equations, the magnetic flux always forms a closed loop. However, a path which forms a closed loop is determined by reluctance of a surrounding medium. That is, the magnetic flux concentrates on least reluctance. Thus, the magnetic flux concentrates on a low reluctance medium such as a soft magnetic material, rather than a high reluctance medium such as air or vacuum, to form a closed loop. The reluctance is a physical quantity of resistance to magnetic force, analogous to an electrical resistance and a capacity of a magnetic circuit element to store magnetic position energy, and it exists in a magnetic material as well we in air or vacuum. Thus, as shown in FIG. 9, the air gaps 100, 110, 120 and 140 in the torque sensor of the embodiment of the present disclosure may be represented as reluctance in a magnetic equivalent circuit. Formula for induced reluctance R in the Hopkinson's law is as follows, and is proportional to magnetic circuit length l and is inversely proportional to permeability µ and cross section A.

$$R = \frac{l}{\mu_0 \cdot \mu_R \cdot A} [At/\omega b]$$

where $\mu_0$ is magnetic permeability of vacuum, and $\mu_R$ is relative magnetic permeability of a magnetic material.

According to the theory described previously, although the first, second and third magnetic bodies 20, 30 and 40 using a magnetic material should be also represented as a reluctance component on the magnetic equivalent circuit of FIG. 9, because a magnetic material has relatively greater relative magnetic permeability than air/vacuum, a reluctance value of the magnetic material becomes very small. For example, if relative magnetic permeability of vacuum/air is 1, specific magnetic permeability of a magnetic material, iron/silicon steel/permalloy, is 5000/7000/10,000~1,000,000, respectively. This is the same as the reason that although there is little resistance in a wire on a magnetic equivalent circuit, such resistance is not represented as a resistance component and is indicated by a solid line.

However, the teeth 21 and the open region 23 of the first magnetic body 20 are represented as variable resistance. This is because when a twist change occurs in the torque sensor, a facing area ratio change of the teeth 21 and the open region 23 of the first magnetic body 20 and the N and S poles of the magnet 10 occurs, a reluctance value changes, and by this change, a movement route of magnetic flux changes. On the other hand, when a twist change occurs in the torque sensor, although a change in magnetic flux occurs in the second magnetic body 30 and the third magnetic body 40 (namely, movement of magnetic flux to the magnetic concentration parts 32 and 42), the second and third magnetic bodies 30 and 40 are a stationary structure and simply connect a movement route of magnetic flux changing with a relative positional change of the magnet 10 and the first magnetic body 20, in the same way as an electrical line through which electric current moves in the magnetic equivalent circuit of FIG. 9, and thus they are not represented as a resistance component in the magnetic equivalent circuit.

Finally, it can be seen that the magnetic flux changes in movement route and intensity with changes in reluctance R, and the reluctance is in a proportional relationship with magnetic circuit length l and an inversely proportional relationship with the magnetic permeability µ and cross section A.

Figure 10:
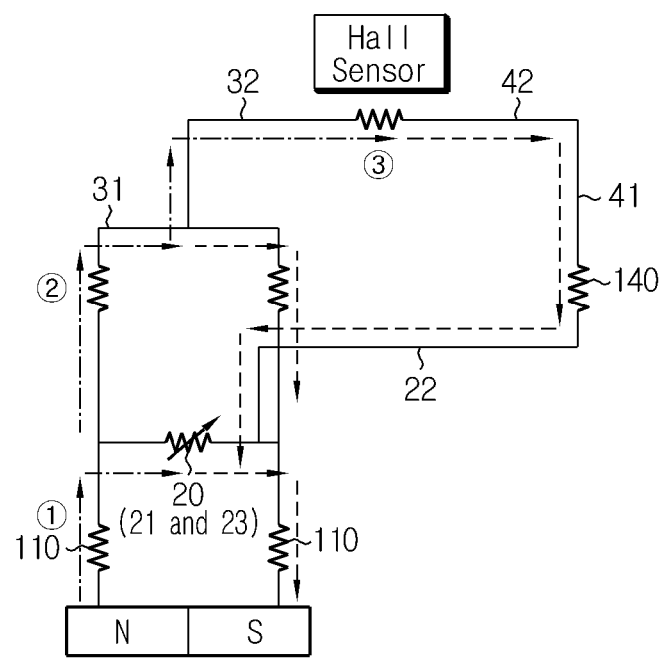
FIGS. 10 through 12 are diagrams showing a closed loop according to a torsion angle of a torque sensor on the magnetic equivalent circuit of FIG. 9.
Figure 11:
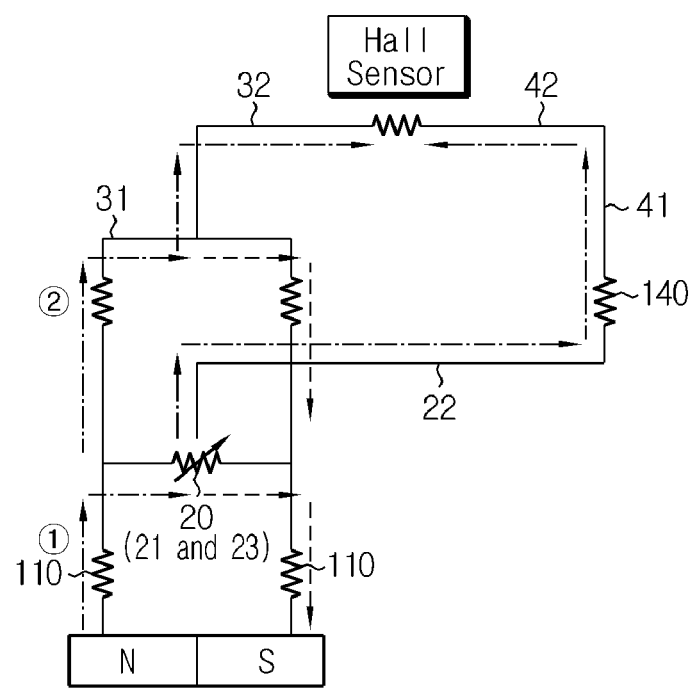
Figure 12:
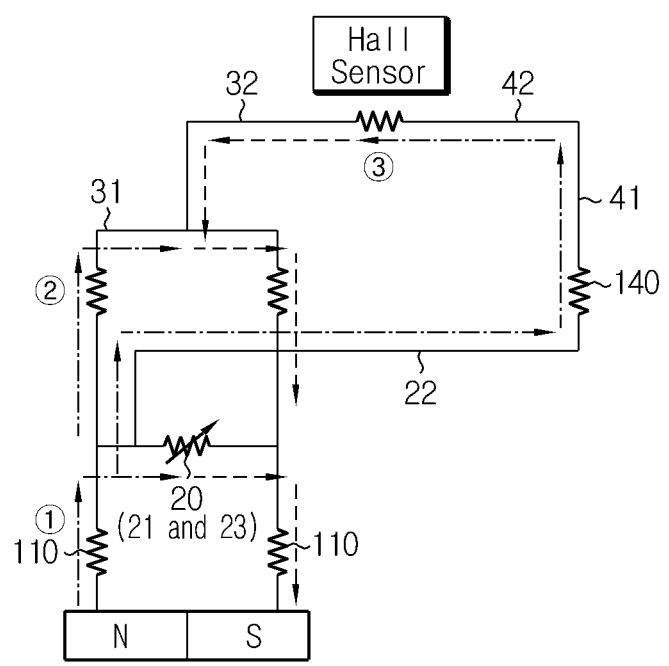

FIGS. 10 through 12 are diagrams showing a closed loop as a function of a twist angle of a torque sensor on the magnetic equivalent circuit of FIG. 9. FIG. 10 is when the twist angle is +maximum, FIG. 11 is when the twist angle is 0 degree, and FIG. 12 is when the twist angle is −maximum. As shown in FIGS. 10 through 12, when the twist angle is 0 degree, #1 closed loop ① and #2 closed loop ② are formed, and #3 closed loop ③ going through the magnetic concentration parts 32 and 42 is not formed. Also, when the twist angle is +maximum and −maximum, #3 closed loop ③ is formed yet in opposite directions of magnetic force lines.

Figure 13:
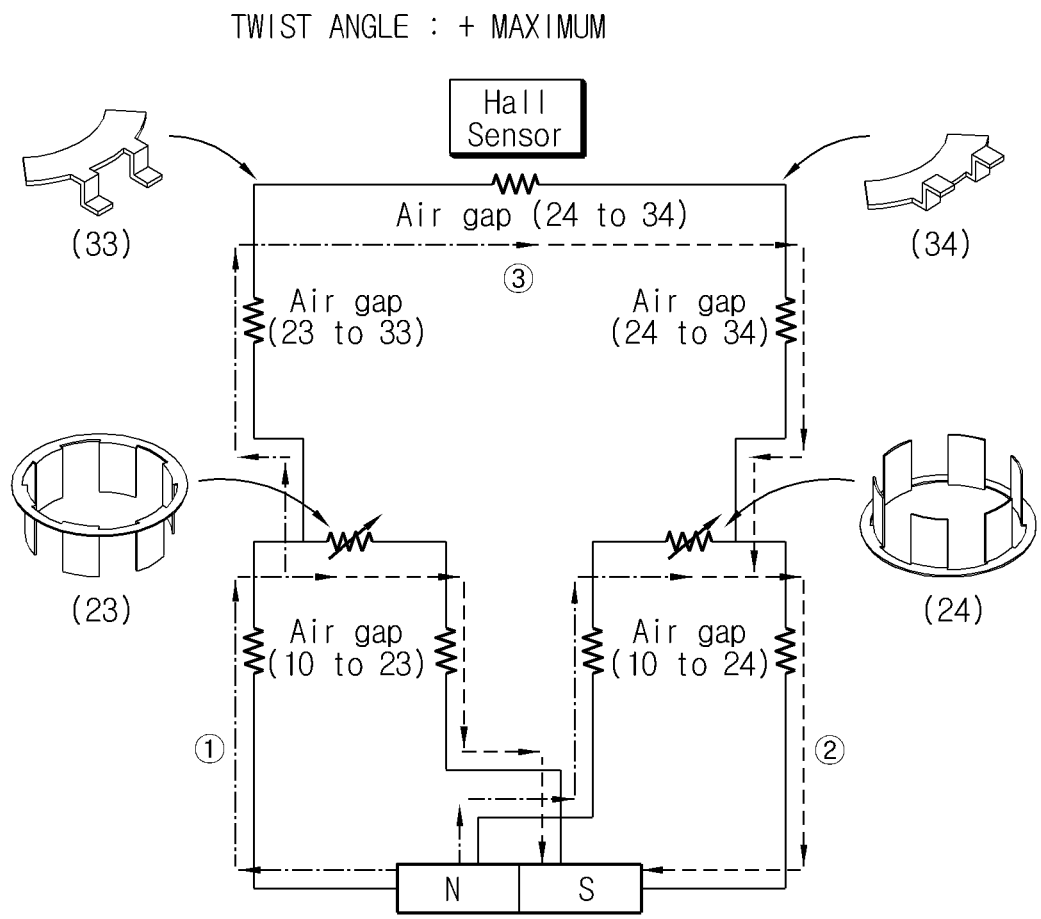
FIGS. 13 through 15 are diagrams showing a magnetic equivalent circuit and a closed loop according to a related art.
Figure 14:
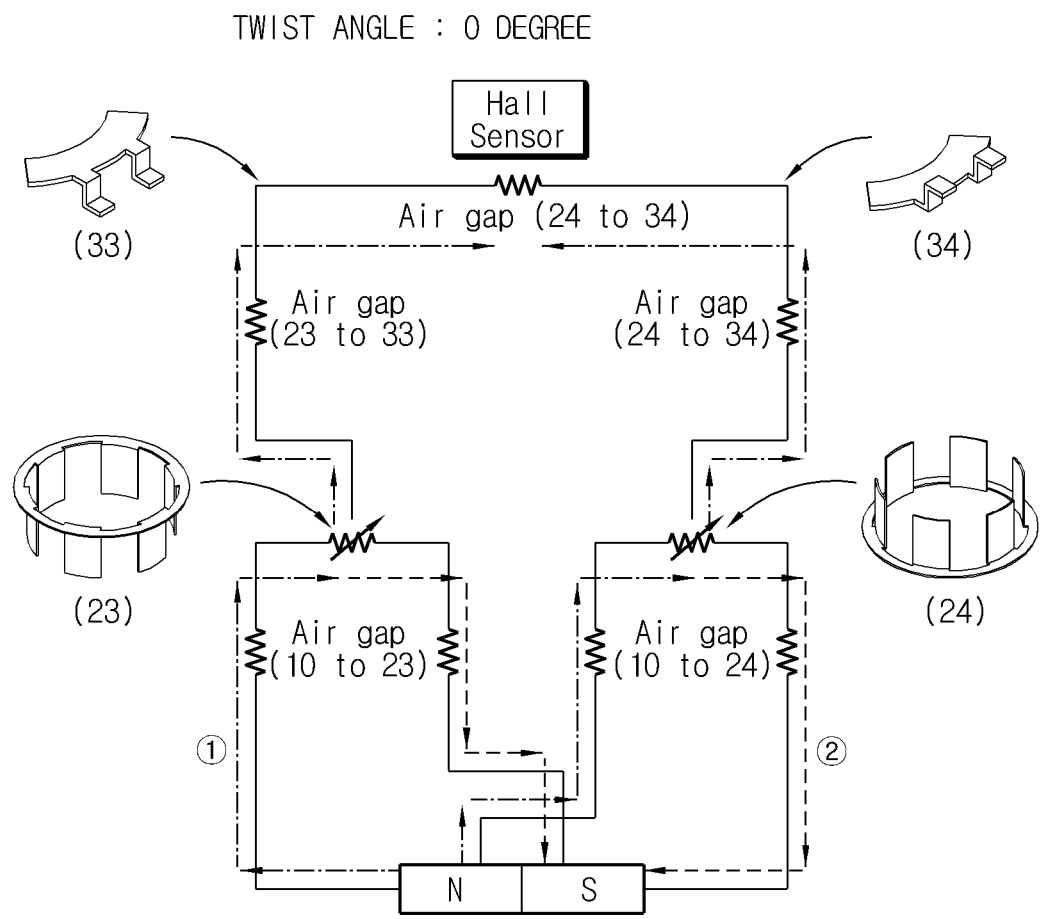
Figure 15:
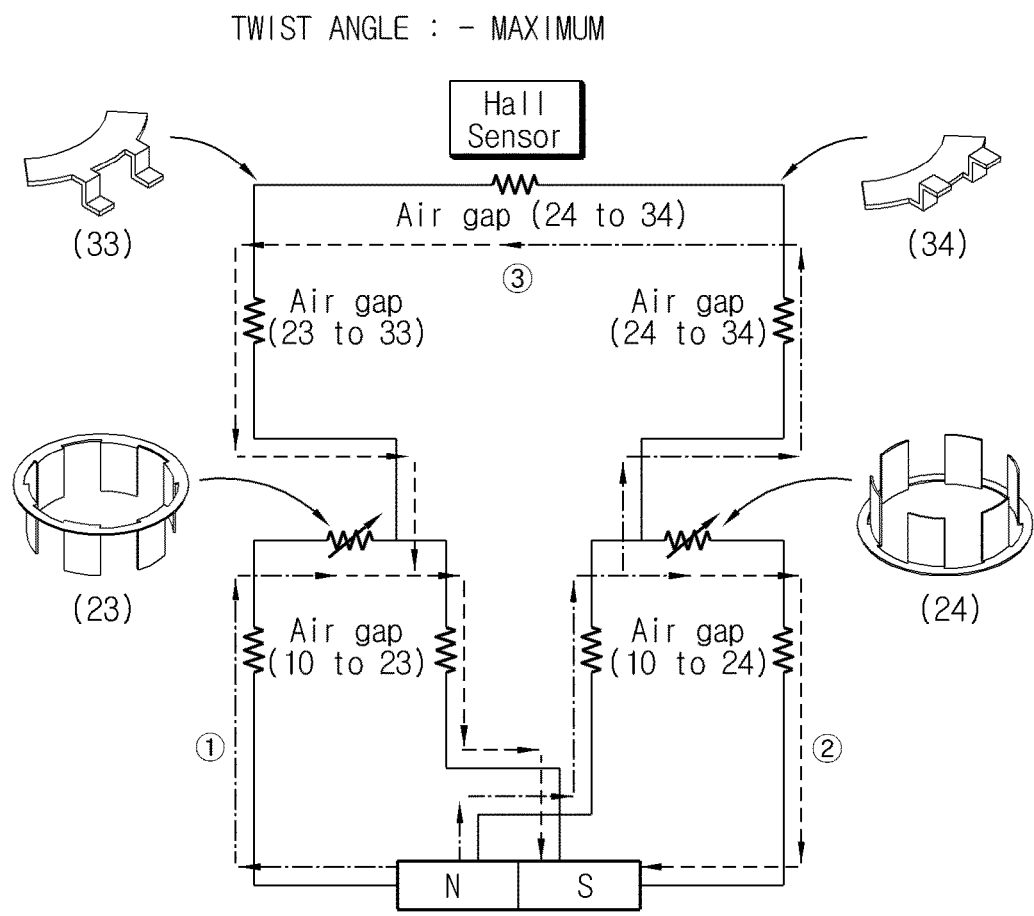

FIGS. 13 through 15 are diagrams showing a magnetic equivalent circuit and a closed loop according to a related art, drawn toward a torque sensor of Korean Patent Publication No. 10-2007-0043000. Reference numerals of FIGS. 13 through 15 are the same as the reference numerals denoted in the specification of Korean Patent Publication No. 10-2007-0043000. FIG. 13 is when the twist angle is +maximum, FIG. 14 is when the twist angle is 0 degree, and FIG. 15 is when the twist angle is −maximum. As shown in FIGS. 13 through 15, when the twist angle is 0 degree, two closed loops ① and ② are formed, while a closed loop going between collecting sectors 33 and 34 (i.e., HALL SENSOR) is not formed. Also, when the twist angle is +maximum and −maximum, three closed loops ①, ② and ③ are formed, and in this instance, the direction of magnetic force lines in #3 closed loop ③ is opposite to each other. When comparing the embodiment of the present disclosure of FIGS. 10 through 12 to the magnetic equivalent circuit of Korean Patent Publication No. 10-2007-0043000 of FIGS. 13 through 15, the embodiment of the present disclosure has one variable resistance, while Korean Patent Publication No. 10-2007-0043000 has two variable resistances.

Figure 16:
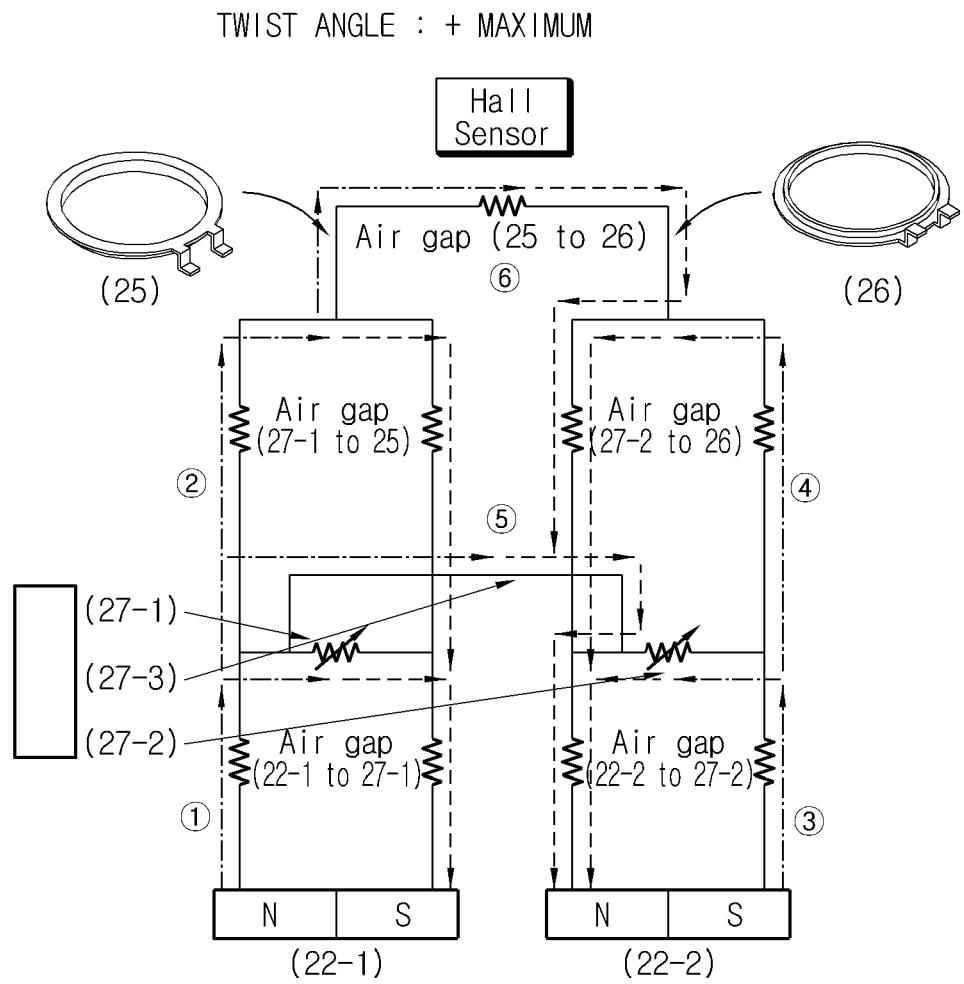
FIGS. 16 through 18 are diagrams showing a magnetic equivalent circuit and a closed loop according to another related art.
Figure 17:
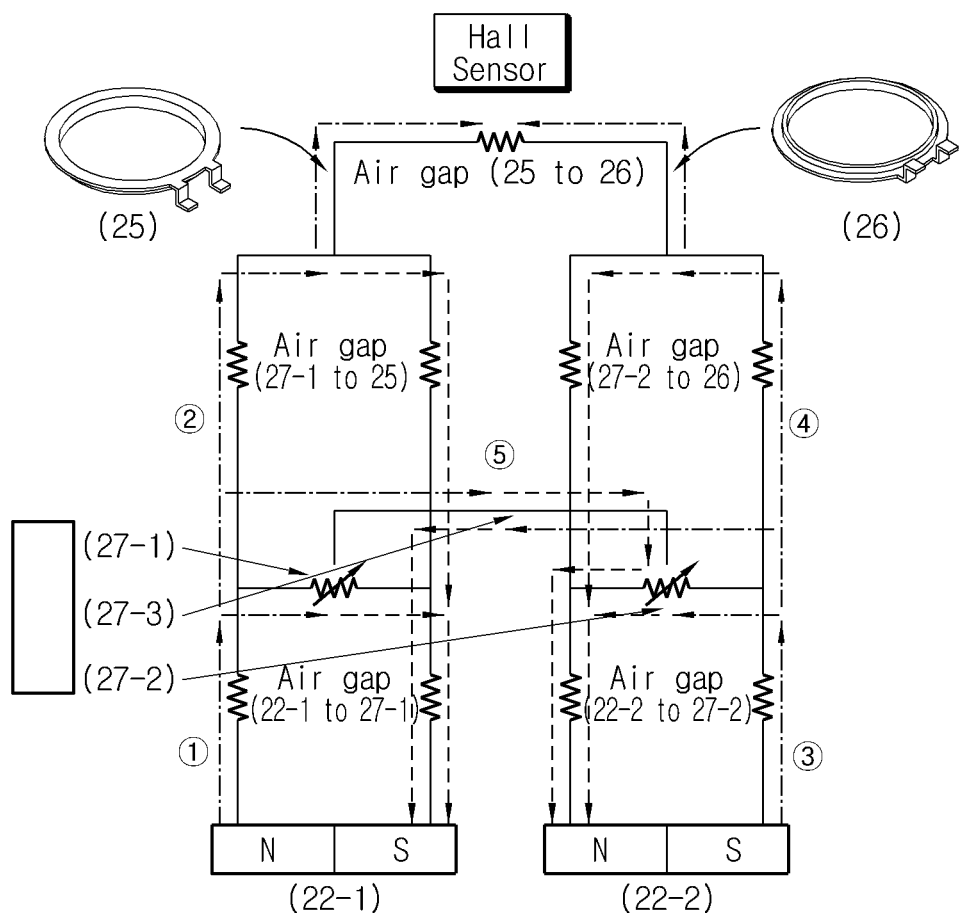
Figure 18:
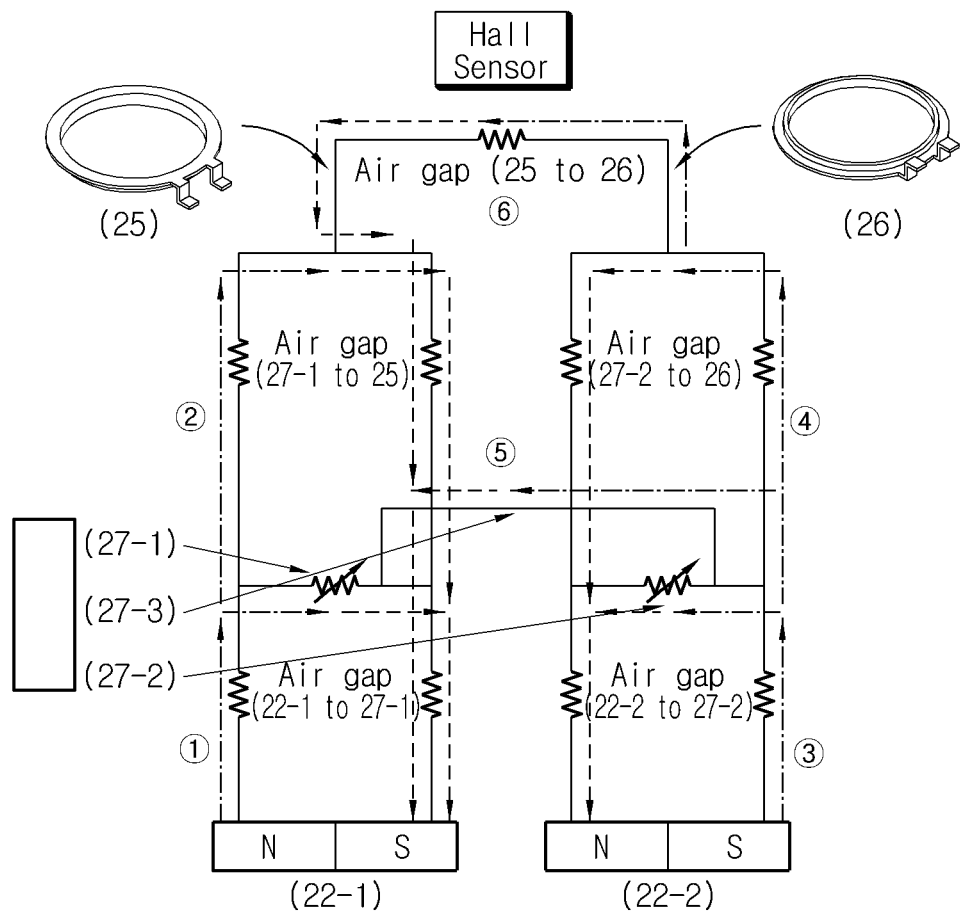

FIGS. 16 through 18 are diagrams showing a magnetic equivalent circuit and a closed loop according to another related art, drawn toward a torque sensor of U.S. Pat. No. 8,327,722. Reference numerals of FIGS. 16 through 18 are the same as the reference numerals denoted in the specification of U.S. Pat. No. 8,327,722. FIG. 16 is when the twist angle is +maximum, FIG. 17 is when the twist angle is 0 degree, and FIG. 18 is when the twist angle is −maximum. As shown in FIGS. 16 through 18, when the twist angle is 0 degree, five closed loops ①, ②, ③, ④ and ⑤ are formed, while a closed loop going through a magnetic detection member (i.e., HALL SENSOR) 9 is not formed. Also, when the twist angle is +maximum and −maximum, six closed loops ①, ②, ③, ④, ⑤ and ⑥ are formed, and in this instance, the direction of magnetic force lines in #6 closed loop ⑥ is opposite to each other. When comparing the embodiment of the present disclosure of FIGS. 10 through 12 to the magnetic equivalent circuit of U.S. Pat. No. 8,327,722 of FIGS. 16 through 18, the embodiment of the present disclosure has one variable resistance and a maximum of three closed loops, while U.S. Pat. No. 8,327,722 has two variable resistances and six closed loops.

As such, the torque sensor according to the embodiment of the present disclosure has a simple magnetic circuit configuration and a reduction of the total number of components, compared to the torque sensor according to related arts. A detailed description is as follows:

When compared to the torque sensor of Korean Patent Publication No. 10-2007-0043000, the torque sensor according to the embodiment of the present disclosure has a crown structure, while the torque sensor of Korean Patent Publication No. 10-2007-0043000 consists of two crown structures.

The torque sensor of U.S. Pat. No. 8,327,722 has a first magnetic body 20, 25 and a second magnetic body 30, 26 surface-facing a magnet 10, 22, while in the torque sensor according to the embodiment of the present disclosure, the third magnetic body 40 corresponding to the second magnetic body 30, 26 of the torque sensor of U.S. Pat. No. 8,327,722 does not need to directly surface-face the magnet 10. Accordingly, the torque sensor according to the embodiment of the present disclosure has a lower height of the magnet 10 than conventional art. Further, the torque sensor of the embodiment of the present disclosure has a reduction in amounts of magnetic materials used because the second and third magnetic bodies 30 and 40 are in the shape of a segment of a circle. In contrast, the torque sensor of U.S. Pat. No. 8,327,722 has an increase in amounts of magnetic materials used because first and second magnetic bodies 25 and 26 are in circular shape.

Further, the torque sensor according to the embodiment of the present disclosure has a smaller number of air gaps (reluctance) in the whole magnetic circuit that reduces the flow of magnetic force lines and the magnetic flux density than conventional art. Further, the number of variable resistance members is smaller than conventional art. This signifies a small loss in the process of induction of a magnetic force produced by a magnet, leading to higher magnetic induction efficiency than conventional art.

While the present disclosure includes many features, such features should not be construed as limiting the scope of the present disclosure or the claims. Further, features described in respective embodiments of the present disclosure may be implemented in combination in a single embodiment. On the contrary, a variety of features described in a single embodiment of the present disclosure may be implemented in various embodiments, singly or in proper combination.

It should be understood by those skilled in the art that many adaptations, modifications and changes may be made to the present disclosure without departing from the technical aspects of the present disclosure, and the present disclosure described hereinabove is not limited by the disclosed embodiments and the accompanying drawings.

What is claimed is:

1. A torque sensor for a steering system, comprising:
   a first magnetic body having an open region and an unopened region arranged in an alternating manner along a circumference of a circular connecting member, the open region and the unopened region facing a magnet having N and S poles arranged in an alternating manner in a circular shape in only one row, the magnet installed at one end of a torsion bar, the first magnetic body connected to the other end of the torsion bar;
   a second magnetic body placed facing the magnet along an outer periphery of the magnet with the first magnetic body interposed between the second magnetic body and the magnet;
   a third magnetic body placed facing the first magnetic body while failing to face the magnet; and
   a magnetic sensing member placed between the second magnetic body and the third magnetic body.

2. The torque sensor according to claim 1, wherein the second magnetic body comprises:
   a magnetic induction surface which surface-faces the magnet with the open region and the unopened region interposed between the magnetic induction surface and the magnet; and
   a magnetic concentration part which extends in an outward direction from the magnetic induction surface.

3. The torque sensor according to claim 2, wherein the third magnetic body comprises:
   a magnetic induction surface which surface-faces the connecting member of the first magnetic body; and
   a magnetic concentration part which extends in an outward direction from the magnetic induction surface of the third magnetic body.

4. The torque sensor according to claim 3, wherein the magnetic sensing member is installed in an air gap between the magnetic concentration part of the second magnetic body and the magnetic concentration part of the third magnetic body.

5. The torque sensor according to claim 3, wherein the connecting member of the first magnetic body and the magnetic induction surface of the third magnetic body surface-face in a longitudinal direction of an axis.

6. The torque sensor according to any one of claim 3, wherein the second magnetic body and the third magnetic body are in a shape of a segment of a circle.

7. A torque sensor for a steering system, comprising:
   a first magnetic body having an open region and an unopened region facing a magnet having N and S poles arranged in an alternating manner in a circular shape in only one row to produce and absorb magnetic force lines, the magnet connected to one end of a torsion bar, wherein the first magnetic body allows the magnetic force lines to pass through the open region and induces the magnetic force lines through the unopened region, and the first magnetic body is connected to the other end of the torsion bar;
   a second magnetic body which induces the magnetic force lines having passed through the open region and transmits the magnetic force lines to the open or unopened region;
   a third magnetic body which transmits the magnetic force lines induced at and transmitted from the second magnetic body to the first magnetic body, and the magnetic force lines induced at and transmitted from the first magnetic body to the second magnetic body; and
   a magnetic sensing member placed between the second magnetic body and the third magnetic body to sense a change in the magnetic force lines.

8. The torque sensor according to claim 7, wherein when a twist in the torsion bar is absent,
   the magnetic force lines produced by the magnet are induced at the unopened region and return to the magnet to form a first closed loop; and
   the magnetic force lines produced by the magnet are induced at the second magnetic body through the open region and return to the magnet through the open region to form a second closed loop.

9. The torque sensor according to claim 7, wherein when a twist in the torsion bar is a positive (+) value,
   the magnetic force lines produced by the magnet are induced at the unopened region and return to the magnet to form a first closed loop;
   the magnetic force lines produced by the magnet are induced at the second magnetic body through the open region and return to the magnet through the unopen region to form a second closed loop; and
   the magnetic force lines produced by the magnet are induced at the second magnetic body, the third magnetic body and the unopened region in a sequential order through the open region and are transmitted to the magnet to form a third closed loop.

10. The torque sensor according to claim 7, wherein when a twist in the torsion bar is a negative (−) value,
    the magnetic force lines produced by the magnet are induced at the unopened region and return to the magnet to form a first closed loop;
    the magnetic force lines produced by the magnet are induced at the unopened region and the second magnetic body in a sequential order and return to the magnet through the unopen region to form a second closed loop; and the magnetic force lines produced by the magnet are induced at the unopened region, the third magnetic body and the second magnetic body in a sequential order and are transmitted to the magnet through the open region to form a third closed loop.

11. The torque sensor according to claim 7, wherein the first magnetic body and the second magnetic body surface-face the magnet, and the third magnetic body surface-faces the first magnetic body while failing to face the magnet.

12. The torque sensor according to claim 11, wherein the second magnetic body and the third magnetic body are in a shape of a segment of a circle.

* * * * *